(12) United States Patent
Hayashi (10) Patent No.: US 8,638,456 B2
(45) Date of Patent: Jan. 28, 2014

(54) IMAGE PROCESSING APPARATUS AND IMAGE PROCESSING METHOD

(75) Inventor: Tomonori Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1221 days.

(21) Appl. No.: 11/736,733

(22) Filed: Apr. 18, 2007

(65) Prior Publication Data

US 2007/0247653 A1 Oct. 25, 2007

(30) Foreign Application Priority Data

Apr. 19, 2006 (JP) ................................ 2006-115464

(51) Int. Cl.
*G06F 3/12* (2006.01)
(52) U.S. Cl.
USPC .......................... 358/1.15; 358/1.13; 358/1.16
(58) Field of Classification Search
USPC ....................................... 358/1.13, 1.15, 1.16
See application file for complete search history.

(56) References Cited

U.S. PATENT DOCUMENTS

| 6,590,674 | B1 * | 7/2003 | Orton | 358/1.18 |
| 2002/0131083 | A1 * | 9/2002 | Hamzy et al. | 358/1.15 |
| 2003/0095284 | A1 * | 5/2003 | Parry | 358/1.16 |
| 2003/0231331 | A1 * | 12/2003 | Tanaka | 358/1.13 |
| 2004/0017583 | A1 * | 1/2004 | Kageyama et al. | 358/1.15 |
| 2004/0136022 | A1 * | 7/2004 | Kizaki et al. | 358/1.13 |
| 2005/0280844 | A1 * | 12/2005 | Ferlitsch | 358/1.9 |
| 2006/0265644 | A1 * | 11/2006 | Koizumi | 715/522 |

FOREIGN PATENT DOCUMENTS

JP 11-015610 A 1/1999

\* cited by examiner

*Primary Examiner* — Marivelisse Santiago Cordero
*Assistant Examiner* — Kent Yip
(74) *Attorney, Agent, or Firm* — Canon U.S.A., Inc. IP Division

(57) ABSTRACT

An image processing apparatus communicatable with other image processing apparatus, determines whether the other image processing apparatus has image data corresponding to application data and whether the image data is processible itself. If the apparatus determines the other apparatus has the image data and the data is processible itself, the apparatus acquires the image data from the other apparatus. If the image processing apparatus determines the other apparatus does not have the image data or the data is not processible, the apparatus acquires the application data from the other apparatus. When the application data is acquired, the image processing apparatus converts the data into image data of a printable data format. Then, the converted image data or the acquired image data is printed.

10 Claims, 10 Drawing Sheets

| STORAGE MEDIUM, SUCH AS FD, CD-ROM |
|---|
| DIRECTORY INFORMATION |
| PROGRAM CODE CORRESPONDING TO THE STEPS IN THE FLOWCHART SHOWN IN FIG.8 |
| |

IMAGE PROCESSING APPARATUS AND IMAGE PROCESSING METHOD

BACKGROUND OF THE INVENTION

1. Field of the Invention

The present invention relates to an image processing apparatus and an image processing method. More particularly, the present invention relates to an image processing apparatus provided with a storage unit that associates application data dependent on application software.

2. Description of the Related Art

Conventional digital copying machines are equipped with a function of storing image data read with a scanner or generated by rasterizing page description language (PDL) data transmitted from a host computer on a hard disk, and reading out the data at any timing to print the data. A finisher can be connected to such a digital copier. The finisher is equipped with finishing functions such as a stapling function, a punching function, a folding function, or a bookbinding function. Some copying machines have a box function. The box function, for example, sets a finishing condition in printing or layout of images in two-sided printing, which is stored on a memory (box) as a document attribute together with image data. The stored data is read at any timing, and printed out based on the document attribute.

Further, for example, as discussed in Japanese Patent Laid-Open No. 11-15610, data created with application software installed by a client for creating a document or a table can be output in the original format (application data of a format dependent on the application software) without converting the data into image data of a print format. The output data is converted into data of the print format in a print server and printed out. Therefore, at the client side, it is not necessary to convert the application data into data of the print format to output the data. This method contributes to reduce the load of the client.

In the above-described digital copying machines, it is desirable that among a plurality of digital copying machines, image data or application data stored in each box can be referred to each other in order to print or copy the data. However, in the above digital copying machines which stores the application data, when the application data is printed, image data corresponding to the print format should be created. Therefore, each time the printing is instructed, the application data has to be interpreted and converted into the image data of the print format. Accordingly, the print performance can be significantly decreased.

Digital copying machines of the type described above are expected to perform many jobs other than printing, and therefore, the above-described load due to the conversion is problematic.

SUMMARY OF THE INVENTION

The present invention is directed to increase efficiency in printing an image corresponding to application data stored in another image processing apparatus.

According to an aspect of the present invention, an image processing apparatus communicatable with at least one other image processing apparatus including a storage unit capable of associating and storing application data dependent on application software, and independent data created by converting the application data into data of a format independent from the application software. The image processing apparatus includes a determination unit configured to determine whether the data format of the independent data is processible, an acquisition unit configured to acquire the independent data from the at least other image processing apparatus if the determination unit determines that the data format of the independent data is processible, and if the determination unit determines that the data format of the independent data is not processible, a conversion unit configured to convert the application data acquired by the acquisition unit into image data of a printable data format, and a printing unit configured to print an image according to the image data converted by the conversion unit or an image according to the independent data acquired by the acquisition unit.

Another aspect of the present invention, relates to a method for an image processing system that has at least a first image processing apparatus including a storage unit capable of storing application data dependent on application software and independent data created by converting the application data into data of a format independent from the application software, and at least a second image processing apparatus that can communicate with the first image processing apparatus and includes a printing unit configured to print an image data. The method includes determining whether the data format of the independent data is processible in the at least second image processing apparatus when an image according to the independent data stored in the storage unit is printed on the at least second image processing apparatus, acquiring the independent data from the at least first image processing apparatus by the at least second image processing apparatus if the data format of the independent data is determined to be processible, acquiring the application data from the first image processing apparatus by the at least second image processing apparatus if the data format of the independent data is determined to be unprocessible, converting, in the at least second image processing apparatus, the application data to be acquired into image data of a processible data format, and printing an image according to the converted image data or an image according to the acquired independent data in the at least second image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
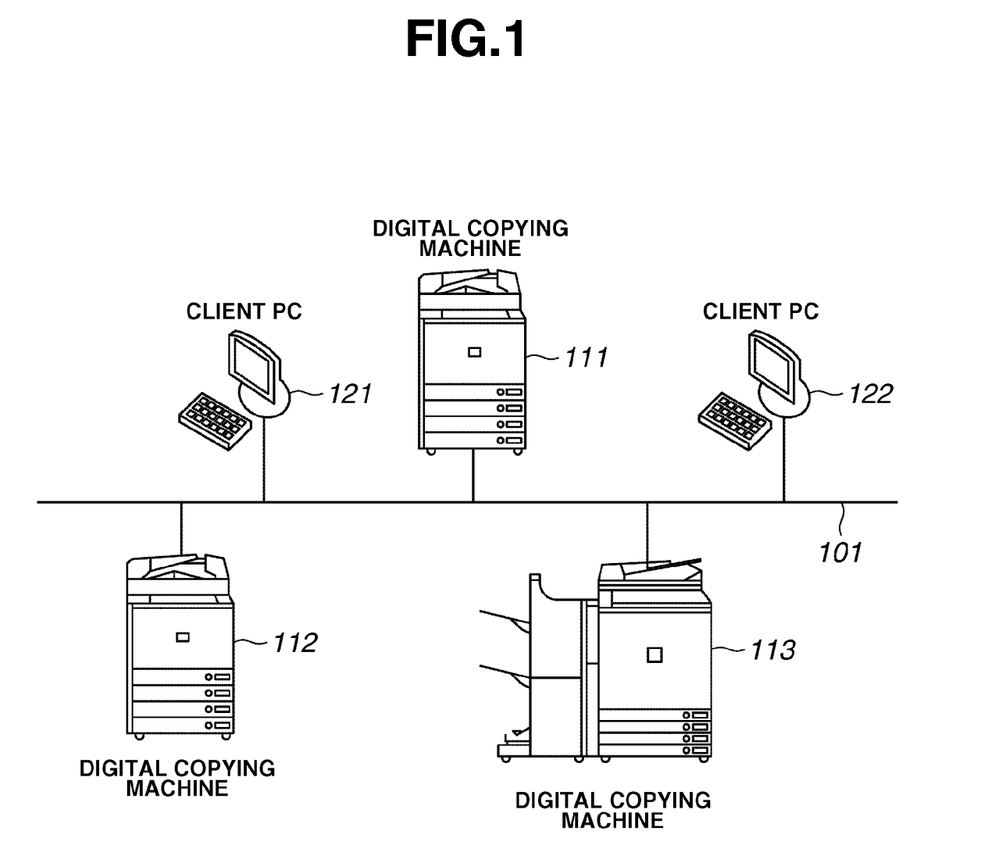
FIG. 1 is an exemplary image processing system to which an image processing apparatus according to a first embodiment of the present invention can be applied.

FIG. 1 is the exemplary image processing system to which the image processing apparatus according to a first embodiment of the present invention can be applied. In the exemplary image processing system, a plurality of digital copying machines 111 to 113 (i.e., image processing apparatuses) are connected with a plurality of client personal computers 121 and 122 through a network 101. The present invention is also applicable to image processing apparatuses other than the above-described digital copying machines such as printing devices equipped with a box function. For example and description purposes, digital copying machine 111 will be used to describe any functionality associated with all of the digital copying machines.

With respect to the network, other than the closed network, the image processing system can communicate with an image processing apparatus on another network through a communication control device such as a router. Further, the network can be a system connectable through a telephone network, for example, a public switched telephone network (PSTN).

The digital copying machines 111 to 113 read originals with scanner units equipped in the digital copying machines, create image data, and form images on output recording media. The read data can be stored by storage units equipped in the digital copying machines, and if necessary, the images can be formed on the output recording media. The storage units include, but are not limited to, a nonvolatile storage device such as a hard disk. For example/description purposes, "paper" will be used in place of "recording media". However, the present invention is not limited to paper as a recording medium, and any recording medium that would enable practice of the present invention is applicable.

The image data stored on the storage devices in the digital copying machines can be acquired by other digital copying machines. Based on the data acquired through the network 101, the image can be formed on the output paper in the digital copying machine at the data acquiring side.

The client personal computers (hereinafter, referred to as PC) 121 and 122 can store application data (APD) created with application software (APS) provided in the storage devices of the digital copying machine 111. The APD stored in the digital copying machine 111 can be converted into image data of a printable format in the digital copying machine 111 according to a user's instruction and an image is formed on the output paper. The APD stored in the storage device of the digital copying machine 111 can be accessed from the PC 121 or 122. The APS creates for a particular use, for example, a document, a table, or a database, in general.

Further, the APS operates on an operating system (OS) of a computer and is distinguished from device drivers. The APD is created with the APS in a format dependent on the APS used for the creation. However, use of the data is not limited to a case where the APS is used. The data may be used in other software which can deal with the format of the data. The APD has a format which can be reedited with the APS used for the creation of the APD or with compatible software. If the APS used for the creation of the APD or the compatible software is not used, the data may not be correctly visualized.

The software compatible with the APS used for the creation of the APD or an integrated circuit (IC) performing a function similar to the software is incorporated in the digital copying machine 111 of the present embodiment. However, the software or the IC can process only predetermined types of APD. To the APD, a file name of "(any prefix).(an extension for specifying the application software type or data type)" is given.

The APD data stored in any of the storage devices provided in the digital copying machine is converted into printable image data using the image conversion function of the digital copying machine 111 and stored in the storage device of the digital copying machine 111.

The image data stored in the storage device of any of the digital copying machines can be acquired from other digital copying machines, and based on the acquired data, an image can be formed on an output paper in the digital copying machine 111 at the data acquiring side.

Figure 2:
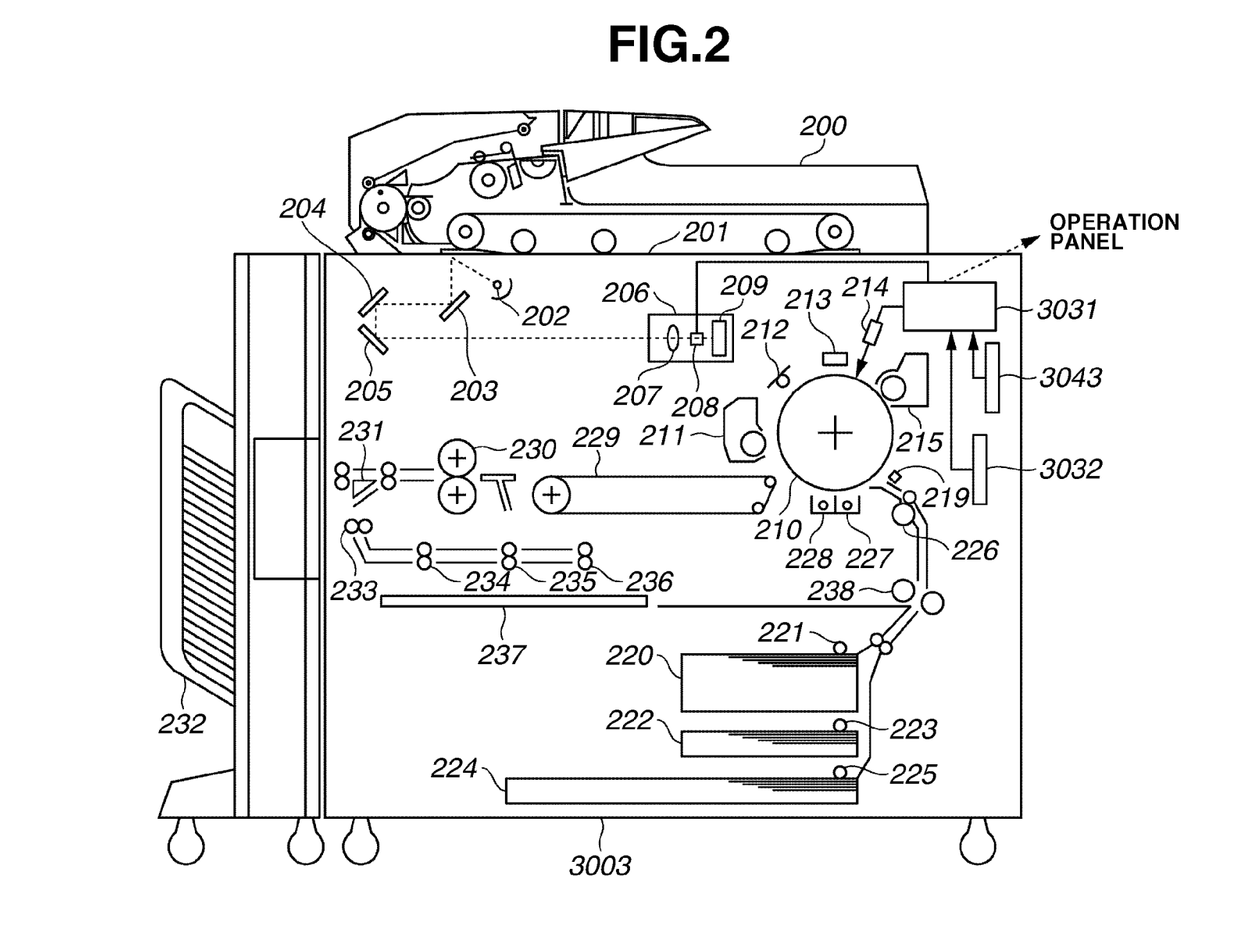
FIG. 2 is a cross sectional view illustrating the digital copying machine illustrated in FIG. 1.

FIG. 2 is the cross sectional view illustrating an exterior view of the digital copying machine 111 illustrated in FIG. 1.

In FIG. 2, an automatic document feeder (hereinafter, referred to as DF) 200 can automatically feed a plurality of documents one by one and sequentially set a front page and a back page of each document on an original document platen. The specific structure is already known, and therefore, a detailed description of the structure is omitted herein.

A plurality of originals to be read is placed on the DF 200. The originals set on the DF 200 are fed one by one and placed on an original document platen 201 by the DF 200. A digital copying machine body 3003 includes a controller unit 3031 configured to control an engine unit.

An original illumination lamp 202 can include, for example, a halogen lamp, and exposes the original placed on the original document platen 201. Scan mirrors 203 to 205 are housed in an optical scan unit (not shown), and guide the reflected light from the original to a charge coupled device (hereinafter, referred to as CCD) unit 206 while making a reciprocating motion.

The CCD unit 206 includes an image-forming lens 207, an image sensor 208, and a CCD driver 209. The image-forming lens 207 is configured to form an image on the CCD with the reflected light from the original. The image sensor 208 includes the CCD, and a CCD driver 209 is configured to drive the image sensor 208.

An image signal output from the image sensor 208 is converted into, for example, 8-bit digital data, and input into the controller unit 3031. A pre-exposure lamp 212 eliminates static electricity on a photosensitive drum 210 for image formation.

A charging device 213 evenly charges the photosensitive drum 210. An exposure unit 214 includes, for example, a semiconductor laser. The exposure unit 214 exposes the photosensitive drum 210 based on the image data processed in the controller 3031 for controlling image processing or the entire machine to form an electrostatic latent image.

A developing device 215 contains black developer (toner). A pre-transfer charging device 219 is used to create pressure before transferring a toner image developed on the photosensitive drum 210 onto the paper.

Paper is fed into the digital copying machine 111, drive by paper feed rollers 221, 223, and 225 from paper feed units 220, 222, and 224. The paper is stopped at an arrangement position on a registration roller 226. Then, synchronizing a transferring operation with the image formed on the photosensitive drum 210, the paper is fed again.

A transfer charging device 227 transfers the toner image developed on the photosensitive drum 210 onto the transfer paper which is being fed. A separation charging device 228 separates the transfer paper, on which the transfer operation is completed, from the photosensitive drum 210. Toner which is not transferred and remains on the photosensitive drum 210 is collected by a cleaner 211.

A conveyance belt 229 conveys the transfer paper, on which the transfer processing has been completed, to a fixing device 230, and the image is fixed on the paper, for example, by heat. A flapper 231 switches the conveyance path of the transfer paper on which the fixing processing has been completed, and performs control to discharge the paper out of the digital copying machine 111 after completing the copying processing, or to convey the paper in a direction of an intermediate tray 237.

Feed rollers 233 to 236 feed transfer paper, on which the fixing processing has been completed, onto the intermediate tray 237 by reversing (multiple) or not reversing (two-sided) the paper. A re-feed roller 238 re-conveys the transfer paper placed on the intermediate tray 237 to the position of the registration roller 236. A staple sorter 232 collates and staples the plurality of paper on which the images are printed.

The controller 3031 includes a CPU 3034 and a RAM 3036, which are described below, and further includes an image processing unit configured to convert application data into printable image data. In response to an instruction from an operation panel unit 3041, the controller 3031 performs the above-described image forming operation.

An exterior memory unit 3043 includes, for example, a nonvolatile storage device such as a hard disk. The exterior memory unit 3043 also includes a box area reserved by a user setting in addition to a control program to be executed by the CPU 3034. The box area stores, but is not limited to, predetermined authentication information, ID information and image data.

An input and output unit 3032 is connected to a network 3000 similar to the network 101 illustrated in FIG. 1, and communicates with the digital copying machines 112, and 113, or the PC 121 and 122 using a predetermined protocol. The digital copying machines 112 and 113 can communicate with another network through a terminal such as a router.

Figure 3:
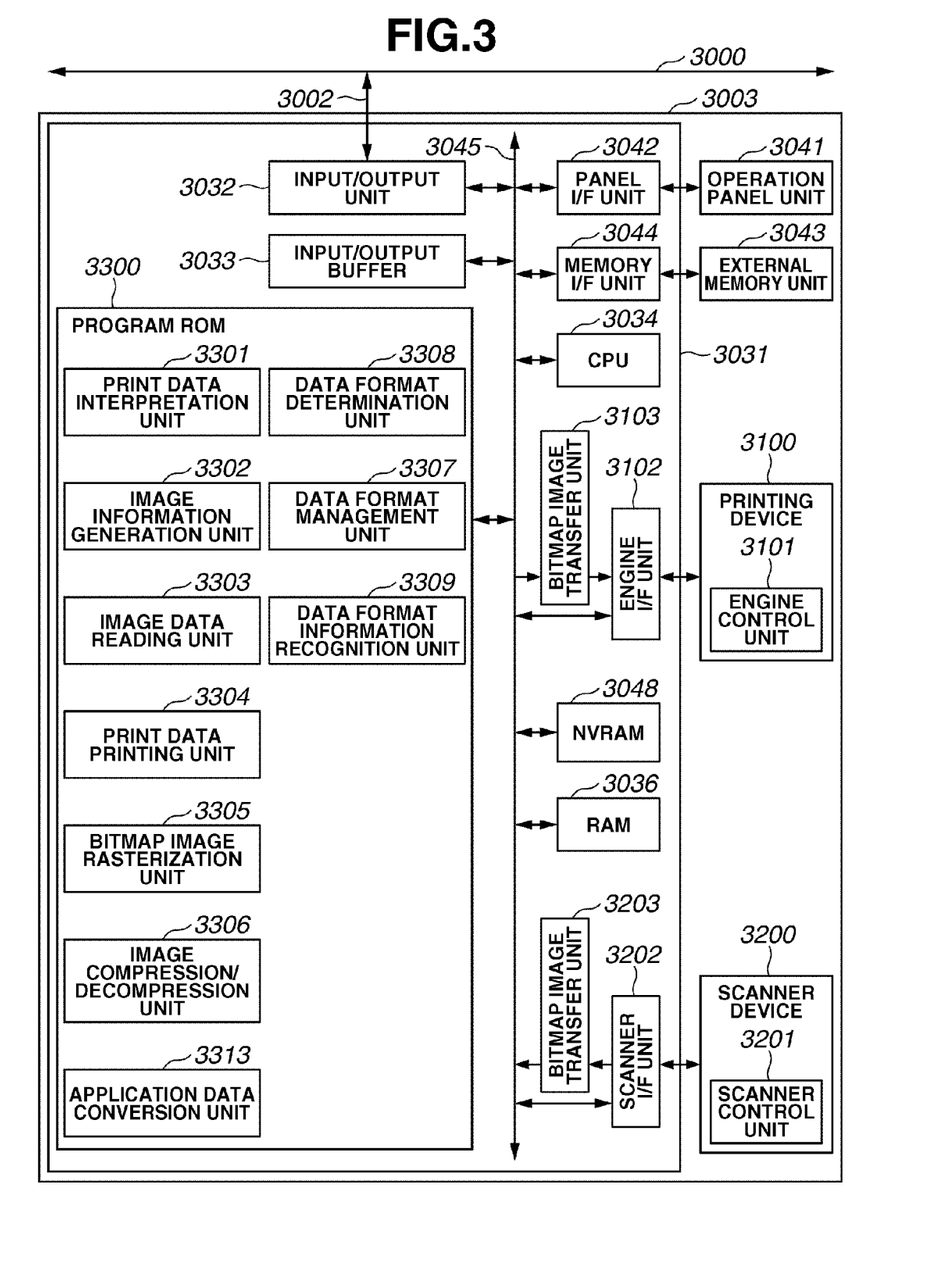
FIG. 3 is a block diagram illustrating a detailed configuration of the controller unit illustrated in FIG. 2.

FIG. 3 is a block diagram illustrating the detailed configuration of the controller unit 3031 illustrated in FIG. 2. The digital copying machine body 3003 includes the controller unit 3031, a printing device 3100 and a scanner device 3200. The controller unit 3031 controls the entire operation of the digital copying machine 111. The printing device 3100 prints an output image on recording paper. The scanner device 3200 reads an image on an original and creates image data.

The controller unit 3031 communicates with each network device using a predetermined protocol via the input and output unit 3032. The input and output unit 3032 controls input and output to or from a network device or a server terminal device on the network 3000 through a communication line 3002.

An input and output buffer 3033 temporarily stores a control code or various data input through a network for printing by the printing device 3100. The input and output buffer 3033 also temporarily stores a control code to be transmitted to a terminal on the network or various data in the digital copying machine 111.

The CPU 3034 controls the entire operation of the controller unit 3031. The CPU 3034 reads out a program which describes an operation of the digital copying machine 111 from a program ROM 3300, and performs a calculation necessary to control the digital copying machine 111. The RAM 3036 is used as a work memory for the CPU 3034 that executes the program stored in the ROM 3300 or processes input or output image data. A nonvolatile RAM (NVRAM) 3048 stores data which has to be stored even if power to the digital copying machine 111 is removed.

The programs stored in the program ROM 3300 include a print data interpretation unit 3301 configured to interpret print control data or PDL data received from a host computer, an image information creation unit 3302 configured to create various image objects, a bitmap image rasterization unit 3305 configured to rasterize an image object into a bitmap image, and an image compression and decompression unit 3306 configured to compress an acquired bitmap image or decompress a compressed image.

Additional programs stored in the program ROM 3300 include a print data printing unit 3304 configured to control print of image data, an image data reading unit 3303 configured to control scanning of an original, a data format management unit 3307 configured to manage a format of data stored on the box area of the external memory unit 3043, a data format determination unit 3308 configured to determine whether the data being stored is image data or application data, a data format information recognition unit 3309 configured to recognize whether a data format is processible, and an application data conversion unit 3313 configured to convert application data into image data that can be interpreted in the print data interpretation unit 3301.

The controller unit 3031 includes a bitmap image transfer unit 3103 configured to transfer a bitmap image data rasterized by the bitmap image rasterization unit 3305 and bitmap image read by the scanner device 3200 to the printing device 3100. The controller unit 3031 also includes an engine I/F unit 3102 configured to connect the printing device 3100 with the controller unit 3031 and a scanner I/F unit 3202 configured to connect the scanner device 3200 with the controller unit 3031.

Bitmap image transfer unit 3203 is configured to take in a bitmap image input from the scanner device 3200. Operation panel unit 3041 allows a user to operate the digital copying machine 111, and a panel I/F unit 3042 is configured to connect the controller unit 3031 with the operation panel unit 3041. Memory I/F unit 3044 is configured to connect an external memory unit 3043 with the controller unit 3031. The external memory unit 3043 stores print data, externally input image data, and various information of the printing device. System bus 3045 is configured to connect the above described units with each other.

The printing device 3100 includes an engine control unit 3101 configured to control a process of printing (i.e., feeding of recording paper, printing, and discharge of the paper). The scanner device 3200 includes a scanner control unit 3201 configured to control an image reading operation (i.e., feeding of an original, reading of an image on the original, and discharge of the original).

Digital copying machine 111 process the following data formats using the box functions. That is, an image data format (first format) that is processed in printing with the digital copying machine 111 and an application data format (second format) that is created using a specific application.

With respect to the box functions of the digital copying machine 111, there are two cases. In one case, both data of the first and second format is stored in the external memory unit 3043. In another case, only data of the first format is stored in the external memory unit 3043. As for the case where only the data of the first format is stored, for example, the user gives an instruction to store data converted into a print format using a printer driver for the digital copying machine 111 installed in a PC 121, by performing the box function.

Alternatively, the user gives an instruction to clear data of the second format in a state that both data of the first format and second format are stored. As for the case where only the data of the second format is stored, for example, the user gives an instruction to send application data created by application software installed in the PC 121 to the digital copying machine 111, and store the data using the box function. When the application data (the data of the second format) is specified and printing of the data in the digital copying machine 111 is instructed, the data is converted into data of the first format and printed. When the printing is completed, the data is not cleared from the external memory unit 3043 and remains in the unit. Therefore, in association with the application data, both of the first and second data are stored. The data of first format can be created not only at the time of printing but can be created at a time when only the conversion is instructed.

With respect to image data of the first format, if the models of the digital copying machines differ, even the data of the first format may not be similarly dealt with among the plurality of digital copying machines. For example, a format used in a color digital copying machine that can process color data can differ from a format used in a monochrome digital copying machine that can process only monochrome data. In other words, even between color digital copying machines, or monochrome digital copying machines, depending on characteristics of the printing devices and the controller units, different data formats can exist. Further, in order that the printing process can be performed at a high speed, after application data is rasterized to bitmap image data, the data of the first format is converted into a data format that can be returned to the bitmap image data by simple decryption.

Then, when the image data stored in the external memory unit 3043 is printed, a unit which acquires the data, for example, the data format determination unit 3308 determines whether the digital copying machine 111 can process the data format of the image data. Process of acquiring information for determining the data format in advance will be described below.

If the data format determination unit 3308 determines that the data format of the image data stored in the external memory unit of the digital copying machine 113 from which the data is acquired is processible, the image data is acquired from the external memory unit through the network 101. On the other hand, if the data format determination unit 3308 determines that the data format of the image data is not processible, application data stored in the external memory unit of the digital copying machine 113 is acquired. Then, the application data conversion unit 3313 converts the acquired application data into image data of a printable data format.

The printing device 3100 prints the image data converted by the application data conversion unit 3313 or the acquired image data. In the present embodiment, the image data converted by the application data conversion unit 3313 is not directly transferred to the printing device 3100, but the data is converted into bitmap data in the bitmap image rasterization unit 3305.

In the present embodiment, the data format determination unit 3308 determines whether the data format of the image data is processible based on model information about the digital copying machine which has stored the acquired image data. However, the data format determination unit 3308 can determine whether the data format is processible based on other information.

Further, the data format determination unit 3308 can include first and second determination functions. The first function determines whether a data format of data to be acquired is image data. The second function determines whether the data format of the image data is processible, if the first determination function determines the data format of the data to be acquired is image data.

First, the first determination function determines whether the digital copying machine 113 that stores data to be acquired, stores the data in the external memory unit as image data. Only when it is determined that the data format to be acquired is not the image data, process for acquiring application data is executed. Thus, if the image data is stored, the image data is acquired in preference to the application data. Accordingly, the time necessary to complete the print processing can be reduced.

Further, according to the present embodiment includes a function for determining whether print setting information, for example, staple processing, is added to the image data to be acquired that is stored in the external memory unit of the digital copying machine 113. In addition, the present embodiment includes a function for setting the print setting information stored in association with the image data to the printing device 3100 when the determination function determines that the print setting information is added. With this function, an operation load from the acquisition of the image data to the print re-setting on the operation panel unit 3041 can be reduced.

In this case, the print setting unprocessible in the digital copying machine 111 that acquires the data is assumed. That is, for example, stapling and color printing is possible in the digital copying machine 113 while the stapling is not possible but only monochrome printing is possible in the digital copying machine 111. In such a case, the setting of color and stapling is not appropriate as the print setting. Accordingly, it is determined whether the setting is possible, and only the possible setting is performed.

Figure 4:
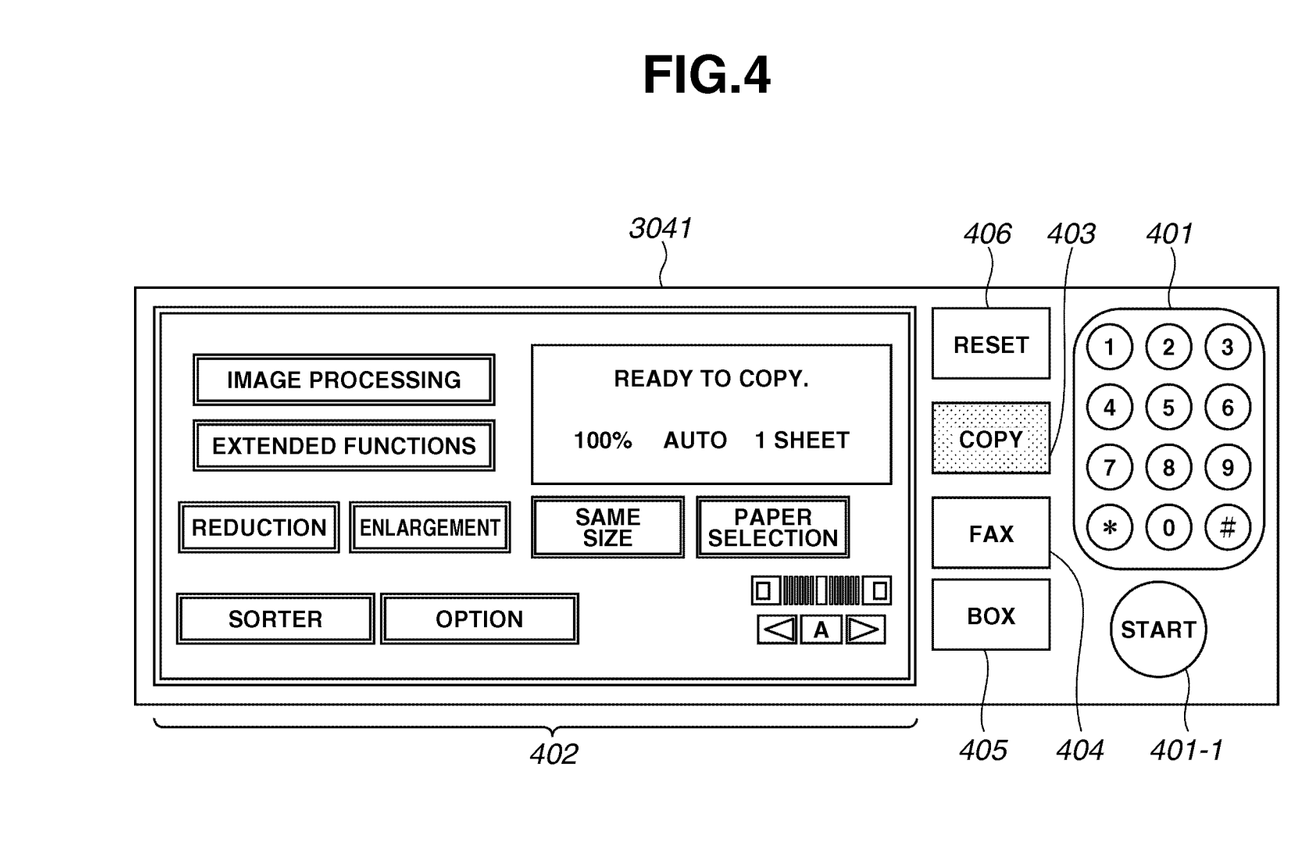
FIG. 4 is a plan view illustrating a configuration of the operation panel illustrated in FIG. 3.

FIG. 4 is an illustration of the configuration of the operation panel unit 3041. Descriptions of keys not directly related to the present embodiment are omitted herein. The display screen that is described is a standard copy screen of the operation panel unit 3041.

The digital copying machine according to the present embodiment includes a copying function, a facsimile function, and a box function. The user can select a particular function from among the plurality of functions by operating an operation unit 400.

In FIG. 4, a numeric pad 401 is used to set the number of sheets to be copied or a numeric value. A copy start key 401-1 is used to initiate the copying function. The liquid crystal touch panel 402 displays a variety of control items available to the user. A copy mode key 403 is used to select a copy mode for executing copying from among the plurality of functions. A facsimile mode key 404 is used to select a facsimile mode for executing a facsimile communication from among the plurality of functions. A box key 405 is used to select a box mode for executing a box function from among the plurality of functions A reset key 406 is used to return to a standard mode while on standby.

Figure 5:
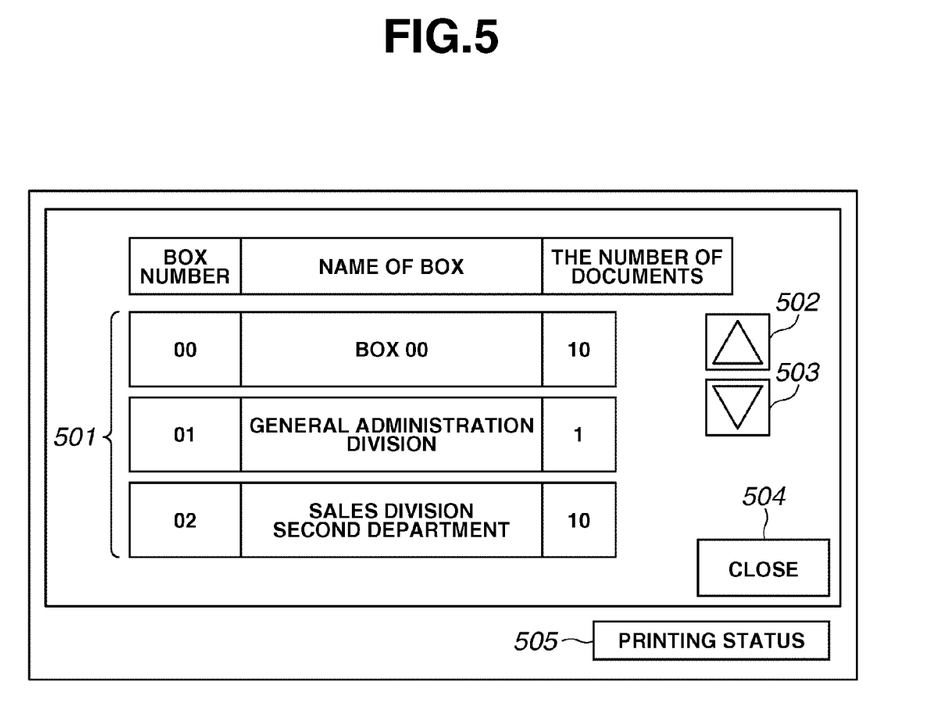
FIG. 5 is a view illustrating an exemplary box function operation screen displayed on the operation panel illustrated in FIG. 4.
Figure 6:
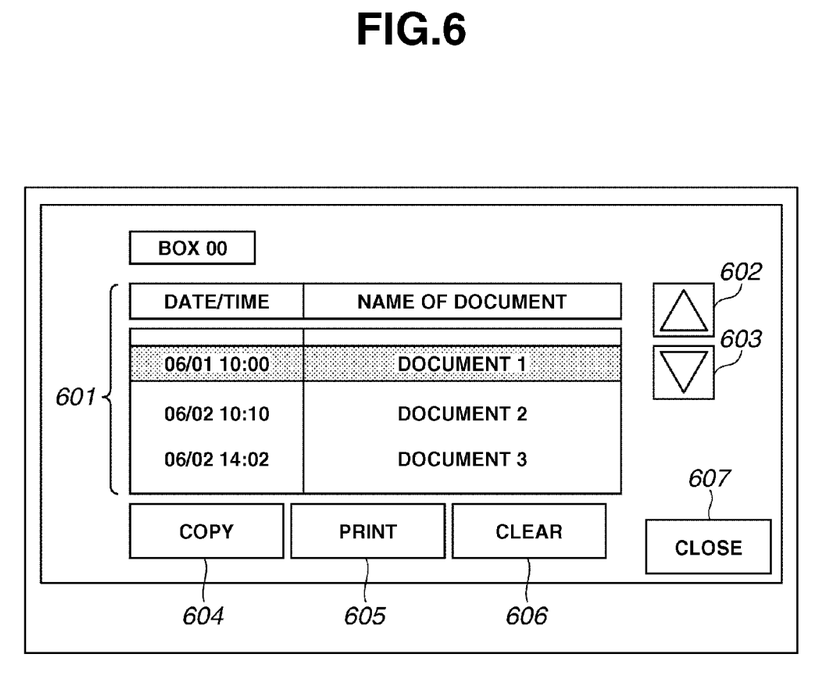
FIG. 6 is a view illustrating another exemplary box function operation screen displayed on the operation panel illustrated in FIG. 4.
Figure 7:
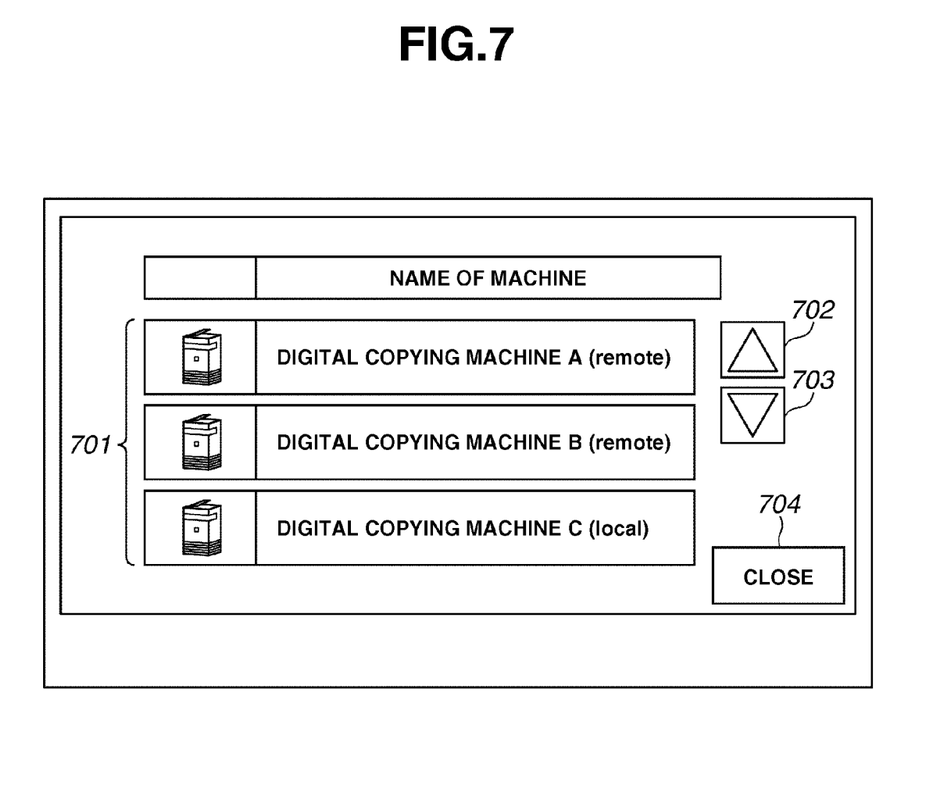
FIG. 7 is a view illustrating still another exemplary box function operation screen displayed on the operation panel illustrated in FIG. 4.

FIGS. 5 to 7 illustrate exemplary box function operation screens displayed on the operation panel unit 3041 illustrated in FIG. 4.

As illustrated in FIG. 5, a box information display 501 displays information of each box such as the number of boxes, names of the boxes, and the number of documents. A user can select a box by touching the display of one of the box numbers.

An up cursor key 502 and a down cursor key 503 are used to scroll the box information display 501 up and down to display the entire list of boxes. A close key 504 is used to close the screen of FIG. 5 and return the screen to the previous standard screen (i.e., FIG. 4).

When the user touches a box number on the operation panel unit 3041, the screen switches to the screen illustrated in FIG. 6. On the screen illustrated in FIG. 6, the user selects a desired document from among a plurality of documents stored within the selected box in order to print, copy, or clear the selected document.

A document information display 601 displays document information stored in the box. The information includes the date and time associated with when a document was stored, and the name of the document. The document currently selected is highlighted in reversed character. When the user touches another file name, the selected document is changed to the other document.

A copy key 604 is used to copy a selected document. A print key 605 is selected after a document is selected to execute print operation to print the document on recording paper. A clear key 606 is used to erase a document in the box. A close key 607 is used to close the screen of FIG. 6. Following selection of the close key 607, the screen switches to the screen of FIG. 5.

Next, FIG. 7, which allows a user to select another digital copying machine will be described.

The screen illustrated in FIG. 7 is displayed when the user selects the box function of the operation panel unit 3041 of FIG. 4. Using the screen, a user can view the contents of a box on another digital copying machine if the other digital copying machine exists on the network that can be referred to.

Digital copying machines that can be selected are displayed on a display 701. If the user touches the display associated with a desired digital copying machine, the box of the corresponding digital copying machine is specified, and a box screen of the specified digital copying machine is displayed. Digital copying machines with a description "remote" denote other digital copying machines connected through the network. A digital copying machine with a description "local" denotes a machine being operated by the user.

An up cursor key 702 and a down cursor key 703 are used to scroll the information display 701 up and down in order to display all available digital copying machines. A close key 704 is used to close the screen of FIG. 7 and return the screen to the previous standard screen.

Figure 8:
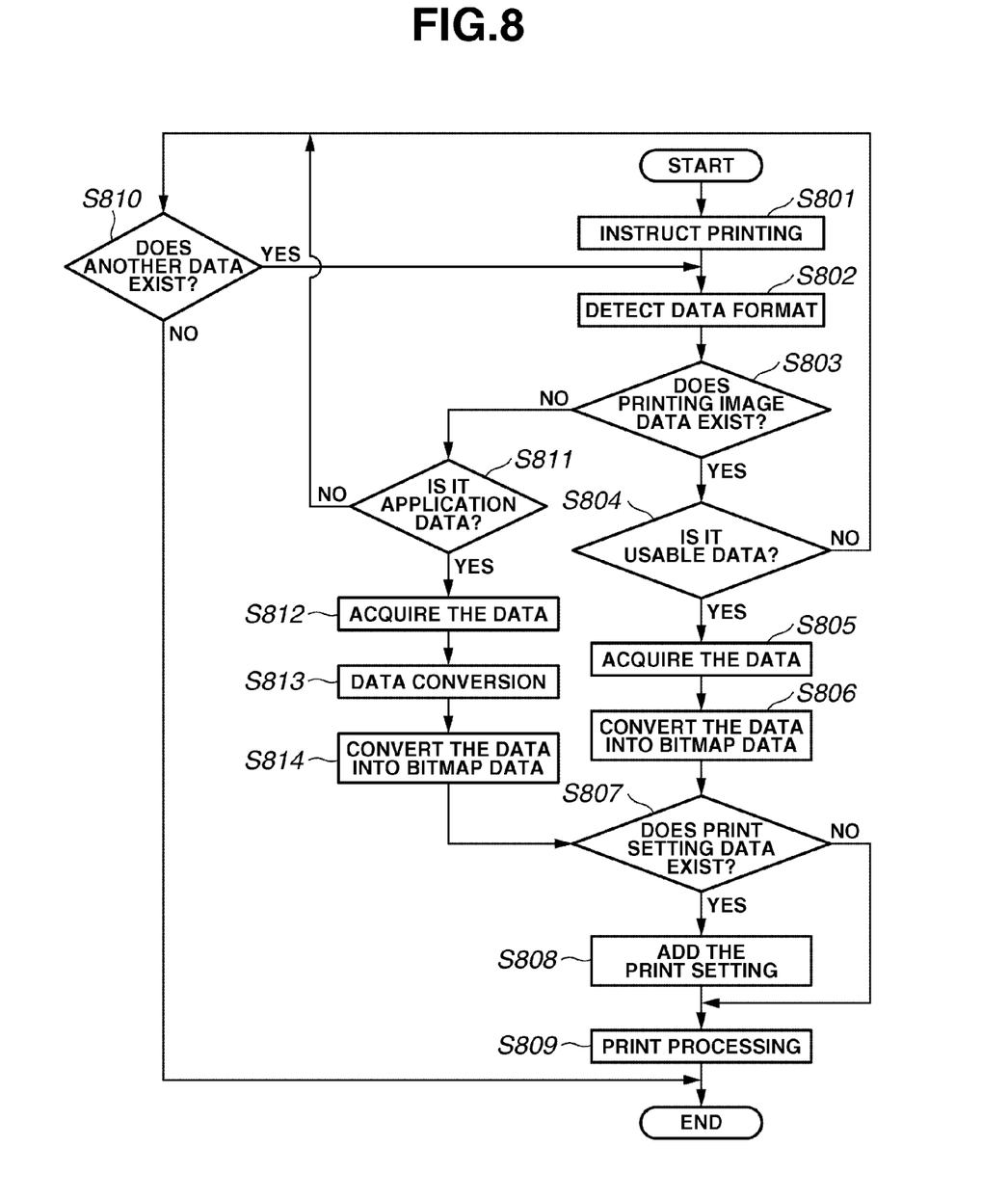
FIG. 8 is a flowchart illustrating an exemplary data processing in the image processing apparatus according to the first exemplary embodiment.

FIG. 8 is the flowchart illustrating the exemplary data processing procedure according to the present embodiment. This processing is an example of the processing performed when printing a box document according to the present embodiment. In order to execute each step, the CPU 3034 loads, into the RAM 3036, a control program stored in the program ROM 3300 or the external memory unit 3043 and executes the program.

The control program includes the data format determination unit 3308 and the data format management unit 3307 illustrated in FIG. 3. Further, the control program includes the data format determination unit 3309, the image compression/decompression unit 3306, the bitmap image rasterization unit 3305, and the application data conversion unit 3313 illustrated in FIG. 3.

First, at step S801, a box document to be printed is selected from the box documents listed on the operation panel unit 3041 illustrated in FIG. 6. When the print key 605 illustrated in FIG. 6 is selected, an instruction is issued to print the selected box document. The selected box document can be stored in the external memory unit 3043 provided in the digital copying machine 111, or in an external memory unit provided in another digital copying machine on the network.

Here, two control methods are possible. In one case, the image data in the selected box document can be directly printed. In another case, the image data has to be converted into image data processible in the application data conversion unit 3313 of the digital copying machine 111. The application conversion unit 3313 stores, in advance, a conversion rule for converting application data for predetermined application software into the image data processible in the digital copying machine 111.

The number of selected box documents can range from one to a plurality of documents or an instruction to combine and output a plurality of box documents as a document can be given. In the present embodiment, the user specifies a box document without recognizing whether the selected box document is application data or image data independent of application software. That is, while a unique file name is set to the application data and the image data respectively, document names separately set are displayed, as illustrated in FIG. 6, and the user can specify the document names.

Returning to step S802, each format of the application data and the image data of the box document instructed to be printed in the data format management unit 3307 is detected. The CPU 3034 determines in step S802, using a program corresponding to the data format management unit 3307, whether the data (image data and application data) of the box document instructed to be printed exists in the digital copying machine 111 to which the user give an instruction to print the data, or the data exists in another digital copying machine connected through the network. Then, from the digital copying machine in which the data of the specified box document exists, information (the machine model for the image data, an application name, or the like) necessary for the data format detection is acquired.

At step S803, the CPU 3034 determines whether an image data format for print exists in the data format of the image data detected in step S802 by using a program corresponding to the data format determination unit 3308. If the CPU 3034 determines that the image data format for print exists (YES in step S803), the process proceeds to step S804. If the CPU 3034 determines that the image data format for print does not exist (NO in step S803), the process proceeds to step S811.

At step S804, the CPU 3034 determines, using the program corresponding to the data format information recognition unit 3309, whether the image data according to the selected image data format for print is processible in the digital copying machine which is instructed to print the data. That is, the CPU 3034 determines whether the image data according to the image data format for print can be rasterized using the program corresponding to the bitmap image rasterization unit 3305.

If it is determined that the image data is usable in the digital copying machine, (YES in step S804), the process proceeds to step S805. If it is determined that the image data is not usable (NO in step S804), the process proceeds to step S810. At step S810, the CPU 3034 determines whether another data of the box document instructed to be printed exists other than the data used for the determination at step S802.

If it is determined that the other data of the box document instructed to be printed exists, the process returns to step 802 and the determination processing is performed with respect to the other data. On the other hand, at step S810, if it is determined that the other data of the box document instructed to be printed does not exist (NO in step S810), the print processing is finished.

Returning to step S804, if it is determined that the usable data exists (YES in step S804), at step S805, the data used for the format detection at step S802 is acquired from the digital copying machine 111. The data can be acquired from the external memory unit 3043 of the digital copying machine 111 or from an external memory unit of another digital copying machine.

At step S806, because the image data acquired at step S805 has been compressed in a certain format, the data is decompressed by the image compression/decompression unit 3306. Then, the CPU 3034 causes the bitmap image rasterization unit 3305 to convert the decompressed image data into bitmap data that can be output to the printing device 3100.

At step S807, the CPU 3034 determines whether a print setting, such as finishing, is added to the print instruction issued in step S801. The CPU 3034 determines whether the print setting is added by searching information added to the document in the box area of the external memory unit 3043, or by inquiring of the digital copying machine that stores the data. The determination methods are switched depending on the data of the box document instructed to be printed.

If the CPU 3034 determines that the print setting is added (YES in step S807), the process proceeds to step S808. If the CPU 3034 determines that the print setting is not added (NO in step S807), the process proceeds to step S809.

At step S808, the CPU 3034 adds the print setting determined in step S807 to the bitmap rasterized image data. Then, at step S809, the CPU 3034 transfers the bitmap rasterized image data and the print setting to the printing device 3100. If, in step S807, it is determined that the print setting is not added (NO in step S807), the print setting set by the user on the operation panel unit 3041 in response to the print instruction issued in step S801 is used, or a default print setting is used for the setting. The printing device 3100 prints out the transferred image data on recording paper according to the print setting and finishes the processing.

Depending on an option arrangement in the digital copying machine where the printing is performed, an unfeasible setting instruction can be included in the print setting. Accordingly, at step S808, resource information including optional devices attached to the digital copying machine 111 and color matching information stored in the external memory unit 3043 are searched in advance. The user can determine via the display screen on the operational panel 3041 whether the printing is to be executed. Thus, it is possible to control the digital copying machine 111 to prevent transferring of image data that can cause a problem. Further, if a print setting unfeasible in its own device is included, the setting can be skipped or replaced with other setting so that the data can be printed.

If the image data is acquired from another digital copying machine, the user can determine via the display screen of the operation panel 3041 whether to register the data in the box area of the external memory 3043 of the digital copying machine 111. Thus, a step for registering printed image data in the box area, or deleting the data according to a user's instruction can be added.

Further, at step S804, if it is determined that the image data is not usable, control can be performed to notify the user via the display on the operational panel unit 3041 that the image data is not usable. In such a case, it can be optionally set whether to notify as to the reason why the data is not usable.

Returning to step S803, if it is determined that the image data format for print does not exist (NO in step S803), the process proceeds to step S811. At step S811, the CPU 3034 determines whether the data format detected by using the program corresponding to the data format determination unit 3308 is the application data processible in the digital copying machine 111. If the data is not processible data (NO in step S811), the process proceeds to step S810. If the data is processible application data (YES in step S811), the process proceeds to step S812.

At step S812, contents of the application data used for the format detection in step S802 is acquired from the digital copying machine storing the box document. At step S813, the CPU 3034 converts the acquired application data into processible image data using the program corresponding to the application data conversion unit 3313. At step S814, the image data converted at step S813 is converted, by the bitmap image rasterization unit 3305, into bitmap image printable in the printing device 3100 and the process proceeds to step S807. Then, the above-described print processing is executed.

Figure 9:
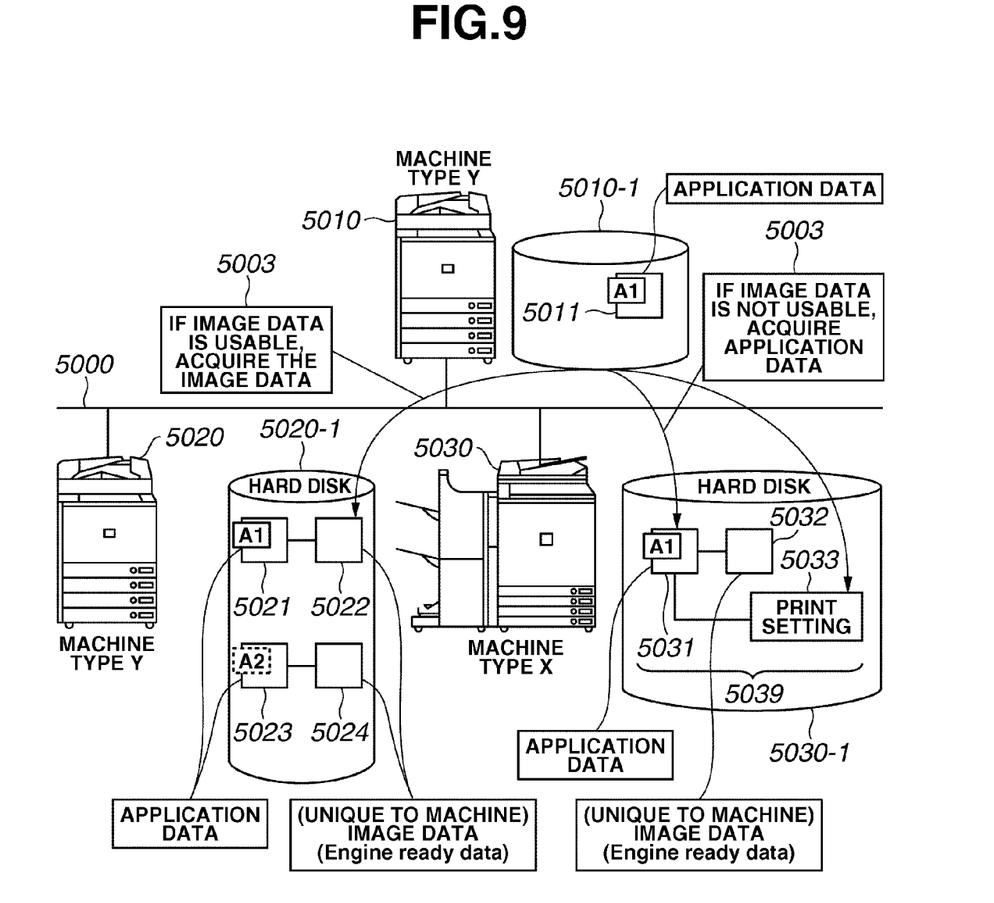
FIG. 9 is a view illustrating exemplary box document processing in the image processing apparatus according to the first exemplary embodiment.

Hereinafter, specific print processing of the box document will be described with reference to FIG. 9 in association with the above-described processing. FIG. 9 is a view illustrating the exemplary box document processing according to the present embodiment. In the present example, subject data stored on other digital copying machines 5020 or 5030 on a network 5000 is selected via an operation panel of a digital copying machine 5010, and the selected data is printed out.

The digital copying machine 5010 stores application data 5011 for application software "A1" in an external memory unit 5010-1. The digital copying machine 5020 stores application data 5021 for the application software "A1" in an external memory unit 5020-1. The digital copying machine 5020 further stores image data 5022 in an external memory unit 5020-1. The image data 5022 is created by converting the application data 5021 into data processible when the data is printed in the digital copying machine 5020.

The digital copying machine 5020 also stores application data 5023 for the application software "A2" and image data 5024 created by converting the application data 5023 in the external memory unit 5020-1. The digital copying machine 5030 stores application data 5031 for the application software "A1" in an external memory unit 5030-1. The digital copying machine 5030 also stores image data 5032 and print setting information 5033 in the external memory unit 5030-1. The image data 5032 is created by converting the application data 5031 into data processible when the data is printed in the digital copying machine 5030

The digital copying machines 5010, 5020, and 5030 hold format information of data stored in each external memory unit respectively. The digital copying machines 5010, 5020, and 5030 can refer to data stored in each of the other digital copying machines. Further, the digital copying machines 5010, 5020, and 5030 can acquire format information of the data stored in the external memory unit of each of the other digital copying machines. Further, in the present embodiment, the digital copying machines 5010, 5020, and 5030 deal with and process the application data, the image data, and the print setting as one document in association with each other.

First, on the operation panel of the digital copying machine 5010, a document (in which the application data 5021 and the image data 5022 is associated) stored in the digital copying machine 5020 is selected. When a print operation is instructed by the digital copying machine 5010, data format of the application data 5021 and the image data 5022 is acquired. If it is determined that image data exists, model names of the digital copying machines 5010 and 5020 are determined, and it is decided whether the image data can be used.

In the present example, both machines have the same model name "Y". Accordingly, it is determined that the image data can be used in both machines. The digital copying machine 5010 reads out the image data 5022 stored in the digital copying machine 5020 and executes the print operation.

Meanwhile, on the operation panel of the digital copying machine 5010, a document 5039 (in which data 5031, 5032, and 5033 are associated with each other) stored in the external memory unit of the digital copying machine 5030 is selected. When the print operation is instructed by the digital copying machine 5010, data formats of the application data 5031 and the image data 5032 are acquired. Then, if it is determined that the image data exists, a CPU of the digital copying machine 5010 determines model names of the digital copying machines 5010 and 5030, and it is decided whether the image data can be used.

In the present example, one digital copying machine model name is "Y" and the other one is "X". Accordingly, the digital copying machine models differ from each other, and the CPU of the digital copying machine 5010 determines the image data 5032 cannot be used. Then, the CPU of the digital copying machine 5010 acquires the application data 5031 from the external memory of the digital copying machine 5030. Then, a data conversion unit of the digital copying machine 5010 is operated to create printable image data (step S813 in FIG. 8).

Further, the print setting information 5033 is acquired from the external memory unit of the digital copying machine 5030 and, the print setting is added to the image data created in executing step S813. The print operation is performed by executing step S807 and the steps thereafter.

By executing the above-described data processing, if the usable data exists in another digital copying machine, the digital copying machine 5010 can start the print processing using the data. Thus, the processing necessary for the data conversion can be skipped. Accordingly, the data processing time from issuing the print instruction to the completion of the printing can be reduced and the print performance can be improved.

According to the present embodiment, when the application data stored in the box function of the digital copying machine is printed, the data can be converted into the image data unique to the device to perform the print processing. Moreover, the print setting such as stapling set at the time of printing and the image data are stored in association with the application data. When the application data stored in each box of the plurality of digital copying machines is referred to or printed, if the image data unique to each device already exists and the data is usable, the image data is acquired and printed out.

Further, if setting information already exists with respect to the print setting and the information is usable, the print setting data is acquired to perform printing based on the acquired setting data. Thus, cases of the conversion processing from the application data to the image data unique to the device can be reduced in number, thus enabling high speed printing.

Further, the printing can be performed using the existing print setting data. Accordingly, the print system of the digital copying machine can be provided in which the instruction of the print setting is performed without the need to set the complicated print setting again.

In the present embodiment, when the user selects a document to be printed, the user can select the document without recognizing the application data and the image data (data independent of the application software). However, the present invention is not limited to the above embodiment. When the user selects the document, the user can select either the application data or the image data. In such a case, for example, after the user selects the document on the screen illustrated in FIG. 6, if both the application data and the image data exist, notification thereof can be displayed and the user can select either data. Further, even if only either of the data is stored, it can be displayed whether the data is the application data or the image data to help the user's selection decision. After either the application data or the image data is thus selected, the print processing is executed similarly to the above-described cases.

When the application data is selected (which is not limited to the explicit selection by the user), if the data cannot be used in its own digital copying machine, the other digital copying machines can be used to convert the data into image data for print. Further, whether the application data can be processed can be determined considering not only the application type, but version information or other information. Whether the image data can be processed can be determined considering not only model information but various information, such as attribute information, contained in the data.

Figure 10:
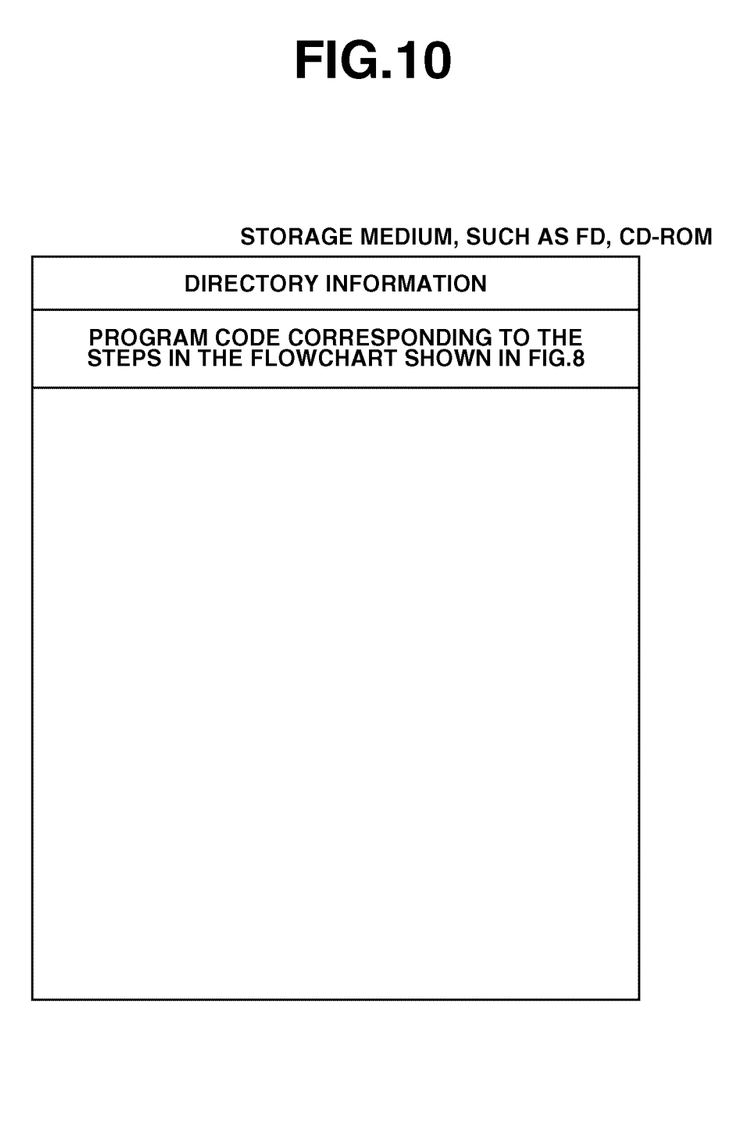
FIG. 10 is a view illustrating a memory map of a storage medium for storing various data processing programs readable in the image processing apparatus according to a second exemplary embodiment of the present invention.

FIG. 10 is illustrates the memory map of a storage medium for storing various data processing programs readable by the digital copying machine according to an exemplary embodiment of the present invention.

Although not specifically illustrated in FIG. 10, information for managing a program group stored on the storage medium, for example, version information, information about an author, and information depending on an OS of a program reading side, for example, an icon for identifying and displaying the program, can be stored on the storage medium. Moreover, data belonging to various programs can also be stored in the above directory. Further, a program for installing various programs on a computer or a program for decompressing a compressed program can be stored.

The functions illustrated in FIG. 8 can be executed by a host computer using a program which is externally installed. In such a case, the present invention can also be applied. That is, from a storage medium such as a CD-ROM, a flash memory, or a floppy disk, or an external storage medium provided through a network, an information group including the program can be provided to an output device.

As described above, the storage medium on which the program code of software implementing the function of the exemplary embodiment is recorded can be provided to the system or the device. The present invention can be realized when a computer (or, CPU or MPU) of the system or the device reads the program code stored on the storage medium and executes the program. In this case, the program code itself, which is read from the storage medium, implements the novel function of the present invention, and accordingly, the storage medium storing the program code constitutes the present invention. If the function of the program is included, any form of program, for example, an object code, a program implemented with an interpreter, and a script data supplied to an OS can be employed.

As the storage medium for supplying such program code, for example, a floppy disk, a hard disk, an optical disk, a magneto-optical disk (MO), a CD-ROM, a CD-R, a CD-RW, a magnetic tape, a nonvolatile memory card, a ROM, and a DVD can be employed. In this case, the program code itself, which is read from the storage medium, implements the function of the exemplary embodiment mentioned above, and accordingly, the storage medium storing the program code constitutes the present invention.

In addition, the program can be supplied by connecting to a home page of the Internet using a browser of a client computer. Then, the program can be supplied from the home page by downloading the computer program itself of the present invention or a compressed file including an automatic installation function into a storage medium such as a hard disk. Further, the program code constituting the program according to the present invention can be divided into a plurality of files, and each file can be downloaded from different home pages. That is, a WWW server, an FTP server, and the like, which allow a plurality of users to download the program file for realizing the function of the present invention with the computer, are also included in the claims of the present invention.

Further, the program according to the present invention can be encrypted and stored on a storage medium such as a CD-ROM, and distributed to the users. A user who has cleared prescribed conditions is allowed to download key information for decrypting the cipher from a home page through the Internet. The user can use the key information to execute the encrypted program, and the program is installed on the computer. Thus, the present invention can be realized.

Further, the function according to the embodiments described above can be implemented not only by executing the program code read by the computer, but based on an instruction according to the program code, an OS (operating system) and the like working on the computer can execute a part or the whole of the actual processing so that the function of the above described embodiments can be realized.

Further, the program code read from the storage medium can be written on a memory which is provided in a function enhancing board inserted in the computer or in a function enhancing unit connected to the computer. Then, based on an instruction according to the program code, the CPU or the like provided in the function enhancing board or in the function enhancing unit can execute a part or the whole of the actual processing so that the function of the above described embodiments can be realized.

As described above, in the exemplary embodiment, the digital copying machines connected with each other through the network store the application data on the external memory unit respectively. When one of the digital copying machines acquires image data from the other digital copying machine and prints the data, if the data format is the application data, the data is converted into a print format and printed out. Then, the data converted into the print format is stored as it is.

That is, when one digital copying machine acquires the image data from another digital copying machine that stores image data in the same format, the data is acquired without changing the data format. On the other hand, when the image data is acquired from a digital copying machine that stores image data in a different format, the application data is acquired. Then, via the application data conversion unit 3313 provided in its own device, the acquired data is converted into image data of a print format, and the data is printed out in the printing device 3100.

Thus, the processing such as the conversion of the application data into the print format becomes unnecessary. Accordingly, the time from issuing the instruction of image data acquisition by the user, to the completion of the printing can be reduced and convenience of the user can be improved.

Further, even if there is no image data or its own device cannot process image data, based on application data, image data can be created and image according to the image data can be printed. Accordingly, a problem that a desired image cannot be printed does not come up.

Thus, efficiency can be improved in printing image data corresponding to application data stored on another image processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-115464 filed on Apr. 19, 2006, which is hereby incorporated by reference herein in its entirety.

What is claimed is:

1. An image processing apparatus communicable with an external image processing apparatus which comprises a storage unit configured to associate and store application data capable of being used by application software and independent data created by converting the application data into data of a format independent from the application software, comprising:
    a processing unit configured to process the independent data for printing the independent data;
    a determination unit configured to determine whether the independent data, out of the application data and the independent data associated and stored in the storage unit of the external image processing apparatus, is processible by the processing unit;
    an acquisition unit configured to acquire the independent data in preference to the application data from the external image processing apparatus if the determination unit determines that the data format of the independent data is processible, and acquire the application data from the external image processing apparatus if the determination unit determines that the data format of the independent data is not processible;
    a conversion unit configured to convert the application data acquired by the acquisition unit into image data of a printable data format; and
    a printing unit configured to print an image according to the image data converted by the conversion unit or an image according to the processed independent data acquired by the acquisition unit.

2. The image processing apparatus according to claim 1, wherein the determination unit determines whether the data format of the independent data is processible based on model information of the external image processing apparatus.

3. The image processing apparatus according to claim 1, wherein the determination unit comprises:
    a first determination unit configured to determine whether the data format is an independent data format; and
    a second determination unit configured to determine whether the data format of the independent data is processible if the first determination unit determines the data format is the independent data format.

4. The image processing apparatus according to claim 1, further comprising:
    an instruction unit configured to instruct the external image processing apparatus to convert the application data into the independent data when the application data corresponding to the image that the printing unit prints is stored on the storage unit, the independent data corresponding to the application data is not stored, and the application data is not processible.

5. The image processing apparatus according to claim 1, further comprising:

a selection unit configured to select the application data or the independent data as data to be acquired from the external image processing apparatus.

6. The image processing apparatus according to claim 1, further comprising:
a second determination unit configured to determine whether print setting information is added to the application data or the independent data stored in the storage unit; and
a setting unit configured to acquire the print setting information by the acquisition unit when the second determination unit determines that the print setting information is added and to set the print setting information for print setting when the printing unit prints the image.

7. A image processing method in an image processing apparatus communicable with an external image processing apparatus which comprises a storage unit configured to associate and store application data capable of being used by application software and independent data created by converting the application data into data of a format independent from the application software, the method comprising:
determining whether the independent data, out of the application data and the independent data associated and stored in the storage unit of the external image processing apparatus, is processible by the image processing apparatus;
acquiring the independent data in preference to the application data from the external image processing apparatus if the determination unit determines that the data format of the independent data is processible, and acquire the application data from the external image processing apparatus if the determination unit determines that the data format of the independent data is not processible;
processing the acquired independent data for printing the independent data;
converting the acquired application data into image data of a printable data format; and
printing an image according to the image data converted from the acquired application data or an image according to the processed independent data.

8. The method according to claim 7, wherein the image processing apparatus comprises a printing unit configured to print an image, creates independent data from the application data when an image is printed according to the application data stored in the storage unit, prints the image data by the printing unit, and stores the independent data in association with the application data.

9. The method according to claim 7, further comprising:
determining whether print setting information is added to the application data or to the independent data stored in the storage unit; and
acquiring the print setting information if it is determined that the print setting information is added and setting the print setting information for print setting when the image processing apparatus prints the image data.

10. A non-transitory computer-readable storage medium storing computer-executable process steps, the computer-executable process steps causing a computer to execute the method of claim 7.

* * * * *